(No Model.)
R. P. WILSON.
Smelting-Oven.
No. 228,793.    Patented June 15, 1880.
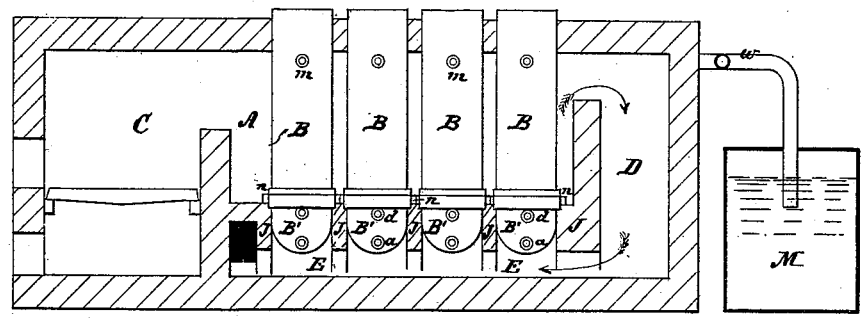
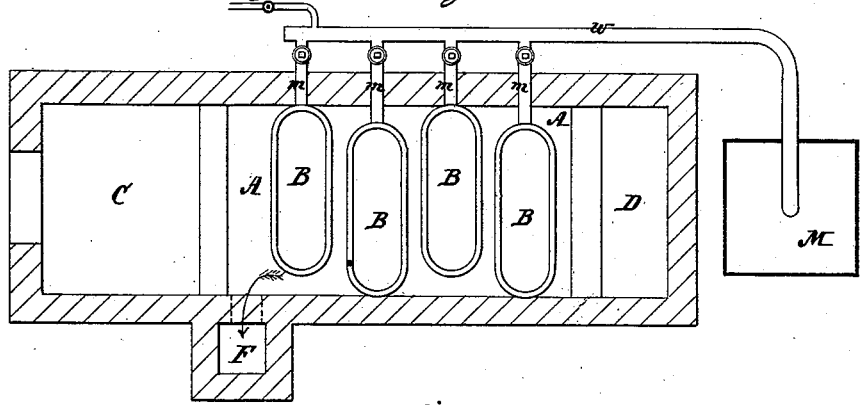
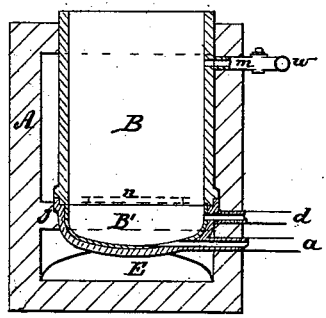
Witnesses.
W K Phelps
Henry VanBlarcom
Inventor.
Riley P. Wilson
per Henry E Roeder
Attorney

UNITED STATES PATENT OFFICE.

RILEY P. WILSON, OF NEW YORK, N. Y., ASSIGNOR TO WILSON SMELTING AND MINING COMPANY.

SMELTING-OVEN.

SPECIFICATION forming part of Letters Patent No. 228,793, dated June 15, 1880.

Application filed March 15, 1880. (No model.)

*To all whom it may concern:*

Be it known that I, RILEY P. WILSON, of New York, in the State of New York, have invented a new and useful Improvement in Smelting-Ovens, for which I have made applications for Letters Patent in Great Britain, France, and Germany, and of which the following is a specification.

This invention relates to the mechanical apparatus for smelting ores and the chemical conditions and results of the process.

Heretofore the treatment of ores, both for roasting and smelting, has mostly been confined to the combining of the ores treated with the fuel which created the heat, which, in connection with an air-blast or the draft of a stack, caused the reducing flame and heat to mingle with the ores and metal. Hence many impurities became incorporated with the base metal, requiring subsequent treatment of an expensive character to purify the metals for common use.

The object of my invention is to provide a system of treating ores of minerals whereby the impurities which now enter into smelted iron or base bullion of the precious metals cannot enter and mix with the same, thereby causing said metals to be produced in a pure state direct from the ores.

The invention consists in the arrangement and construction of a series of upright retorts set in an inclosed furnace, so that the heat in the furnace will pass around and below the outside of the retorts and heat the same to any degree required for the treatment or smelting of the various ores, as iron, steel, silver, gold, lead, zinc, &c.

The invention further consists in constructing the retorts with one or two openings or branches near the lower end of the retort for the purpose of withdrawing the mineral and slag from the same, and also with an opening or branch near the upper end of the retort for the exit of gases or oxides into a pipe leading to the condensing-chamber.

I obtain these objects by the smelting-oven illustrated in the accompanying drawings, in which—

Figure I represents a longitudinal section, Fig. II is a horizontal section, and Fig. III a cross-section, of the same.

Similar letters refer to similar parts throughout the several views.

A represents the oven, into which the retorts B are placed. At one end of the oven a suitable fire-place, C, is arranged.

The retorts B, I prefer to make in two parts. The upper part, B, is made of fire-clay, plumbago, or any other suitable material, while the lower part, B', is made of iron, and lined with any suitable material. These retorts are arranged in the furnace in nests of two or more, and are placed alternately—that is, the one end or side of one retort is placed close to one side of the brick-work of the furnace, and the adjoining retort is placed close to the other or opposite side of the furnace.

The inner part of the furnace is made of such a size as to leave about eight inches, more or less, between the side of the retort farthest from the brick-work, and this brick-work or side of the furnace and the retorts are placed about the same distance from each other. By this arrangement the flame and heat is compelled to travel around each retort, except where the same touches the brick-work. The flame and gases pass then through the end flue, D, and under the bottom of the retorts through the flue E into the smoke-stack F.

On the sides of the lower part, B', of the retorts suitable flanges $n$ are provided, resting and supporting the retorts upon the floor or division-walls J. The size of the retorts I prefer to make about fifteen inches by four feet oblong, and from four to six feet high.

The retorts are provided at their lower part, preferably at the sides placed nearest to the brick-work of the furnace, with two branches, $a$ and $d$, passing through the wall of the furnace. The lower branch or opening, $a$, is for drawing off the metal or bullion, and the upper branch, $d$, for drawing off the slag.

Near the upper end of the retorts, on the same side, a branch, $m$, is arranged, passing through the wall of the furnace and connected to the pipe $w$, arranged on the outside of the furnace, to conduct the gases or oxides into the condensing-chamber M.

$h$ is a small pipe connected to pipe $w$, for the purpose of introducing steam into said pipe for cleaning the same.

The tops of the retorts are closed by a door or cover, to be luted when in use; or a hopper may be attached to each retort, closed by a sliding door at the bottom, so that the hopper may be filled ready for a charge, by which arrangement the excessive heat of the retort will heat and dry the ore preparatory to its being dumped into the retort when required.

What I claim as my invention, and desire to secure by Letters Patent, is—

1. The combination of a furnace, A, with upright retorts B, set in nests of two or more, and alternately against the sides of the furnace, the back flue, D, and lower return-flue, E, in the manner and for the purpose substantially as described.

2. The combination of retorts B, furnace A, flue D, return-flue E, and connecting-pipe $w$, in connection with the gas and oxide condenser M, arranged in the manner and for the purpose substantially as described.

RILEY P. WILSON.

Witnesses:
HENRY E. ROEDER,
J. B. NONES.